United States Patent [19]

Kondo

[11] Patent Number: 4,618,210
[45] Date of Patent: Oct. 21, 1986

[54] OPTICAL SWITCH OF SWITCHED DIRECTIONAL COUPLER TYPE

[75] Inventor: Michikazu Kondo, Tokyo, Japan

[73] Assignee: NEC Corporation, Tokyo, Japan

[21] Appl. No.: 502,805

[22] Filed: Jun. 9, 1983

[30] Foreign Application Priority Data

Jun. 9, 1982 [JP] Japan .................................. 57-98820
Sep. 7, 1982 [JP] Japan ................................. 57-155456

[51] Int. Cl.⁴ ............................................. G02B 6/10
[52] U.S. Cl. ............................. 350/96.14; 350/96.13
[58] Field of Search ............... 350/96.12, 96.13, 96.14

[56] References Cited

U.S. PATENT DOCUMENTS 4,013,000  3/1977  Kogelink ......................... 350/96.13

FOREIGN PATENT DOCUMENTS 2525678 12/1976 Fed. Rep. of Germany ... 350/96.13
0144353 12/1978 Japan ................................. 350/96.13
0007951  1/1979 Japan ................................. 350/96.14
0054415  5/1981 Japan ................................. 350/96.13

OTHER PUBLICATIONS

"GHz Bandwidth Optical Channel Waveguide TIR Switches and 4×4 Switching Networks" Chang et al., Conference: Topical Meeting on Integrated and Guided-Wave Optics Pacific Grove, Calif., U.S.A., Jan. 1982.
"VLS1 Systems" by Carver Mead, Oct. 1980.

*Primary Examiner*—William L. Sikes
*Assistant Examiner*—Akm E. Ullah
*Attorney, Agent, or Firm*—Sughrue, Mion, Zinn, Macpeak and Seas

[57] ABSTRACT

An optical switch with switched optical directional couplers, switched by the application of either 0 volt or a voltage $V_1$, different from 0 volt. Coupling of almost 100% is achieved when the $V_1$ voltage is applied to a selected directional coupler, while coupling of 0% to 20% occurs when 0 volt is applied to the selected directional coupler. The optical directional coupler is formed by locating adjacent optical waveguides in close proximity and applying electric field producing electrodes to the waveguides where they are in close proximity such that the substrate below opposing waveguide sections receive electric fields of opposite directions.

8 Claims, 7 Drawing Figures

OPTICAL SWITCH OF SWITCHED DIRECTIONAL COUPLER TYPE

BACKGROUND OF THE INVENTION

The present invention relates to optical switches employing controllable phase-mismatched coupling between optical waveguides arranged on a substrate, and more particularly to an optical switch, in which a plurality of optical switch elements are integrated on a single substrate, for electrically controlling and switching as desired the path of light between a plurality of input and output optical waveguides.

Such an optical switch is intended for use in a multi-channel optical switch for switching optical signals in time series and multiplexing them for transmission over a single optical fiber transmission path or, conversely, distributing by time division a plurality of optical signals sent over a single fiber to a plurality of terminals, or for use in an optical switching network in which a matrix is so composed that a plurality of transmission paths can be connected to one another as desired.

As optical communication systems are increasingly used in practical application, there are continued efforts to develop further sophisticated systems having greater capacities and/or more diverse functions. There are in demand new systems which can carry out such functions as exchange between optical transmission networks and high-speed connection and switching between the terminals of optical data buses. The need for optical switches to make possible these functions is accordingly growing.

Currently available optical switches for practical use include those using mechanical shift by electromagnets or the like. There, however, are not fully satisfactory in respect to speed, multi-point switching ability and reliability.

Therefore work is under way to develop guided wave type optical switches which are satisfactory in all these respects and, moreover, are highly efficient, compact and adaptive to single mode fiber systems. A guided wave type optical switch, in which are used optical wave guides arranged on a substrate, has the advantage that a plurality of optical switch elements can be integrated on a single substrate, and accordingly a matrix type optical switch of guided wave design can be constructed with comparative ease.

The directional coupler type, total internal reflection type, Bragg diffraction type and Y-branching type structures have so far been proposed for guided wave optical switches. The first two permit relatively ready suppression of optical losses and crosstalks, both vital parameters for optical switches, and are simple enough in structure to allow the realization of multi-channel or matrix design.

A total internal reflection type switch has two optical waveguides crossing each other at an angle of several degrees. Controlling electrodes are provided at their intersection to control light reflection at the intersection. For an example of a matrix type optical switch of the total internal reflection design, see C. L. Chang, F. R. El-Aklari and C. S. Tsai, "Fabrication and Testing of Optical Channel Waveguide Total Internal Reflection (TIR) Switching Networks Proceedings of the Society of Photo-Optical Instrumentation Engineers, Vol. 239, Guided-Wave Optical and Surface Acoustic Wave Devices, Systems and Applications (1980), pp. 147–151. As a TIR switch requires an appreciable angle of intersection to achieve sufficiently low crosstalk, a substantial applied voltage is necessary. Since it usually is difficult to construct a high-voltage and yet high-speed driving circuit, a TIR switch is unsuitable for high-speed switching.

Meanwhile, in a directional coupler type optical switch, two optical waveguides of several microns to several tens of microns in width are arranged close to each other at a distance of several microns to constitute an optical directional coupler, and the coupling of said two optical waveguides is controlled by applying voltages on control electrodes provided in the vicinity of the optical waveguides. This type optical switch operates at lower voltages and can achieve a low level of crosstalk with greater ease than optical switches of other types. (See, for example, R. V. Schmidt and L. L. Buhl, "Experimental 4×4 Optical Switching Network", Electronics Letters (1976), Vol. 12, No. 22, p. 575.)

However, this type switch requires two different voltages, $V_1$ ($\neq 0$) and $V_2$ ($\neq 0$), to drive each optical switch element and, moreover, the voltages somewhat vary from element to element, so that a complex driving circuit is required. For high-speed driving of an optical switch, low voltages are desirable. Further, for achieving a low crosstalk of −20 dB or below which is required by the system, the optical waveguides and electrodes have to be perfect, the symmetry between the two optical waveguides has to be highly precise. However, meeting these requirement is a difficult task.

Moreover, in a conventional matrix type optical switch in which many pairs of input and output ports are connected in a certain combination, if any two pairs out of them are to be interchanged, the connections of a great number of optical switch elements will have to be altered at the same time. In other words, since the light path within the matrix optical switch has to be substantially changed when only two pairs of input and output ports are to be interchanged, there is involved the disadvantage that the connections between other input and output ports are momentarily disturbed or the output light levels of other output ports instantaneously drop at the time of switching.

SUMMARY OF THE INVENTION

Therefore, one object of the present invention is to provide an optical switch having a plurality of switch elements capable of switching with 0 volt and only one voltage.

Another object of the invention is to provide an optical switch capable of readily achieving a sufficiently low level of crosstalk without using stringent manufacturing methods.

Still another object is to provide an optical switch that can be driven with a voltage lower than that used by previously known switches.

Yet another object is to provide an optical switch wherein switching of any input and output ports can affect the connection of no other ports.

According to the present invention, there is provided an optical switch wherein a number of switching elements for switching light beams to a plurality of optical waveguides are constructed on a substrate, comprising: a first group of optical waveguides consisting of N (N is an integer not smaller than 2) optical waveguides having a refractive index greater than that of the substrate; a second group of optical waveguides consisting of M (M is an integer not smaller than 1) optical waveguides having a refractive index greater than that of the substrate; directional couplers of a first kind, each consisting of one of the optical waveguides of said first group and the adjoining waveguide in the same group, and directional couplers of a second kind, each consisting of the Nth optical waveguide of said first group and the first optical waveguide of said second group, wherein each of said directional couplers contains control electrodes arranged close to each waveguide, so that the intensity of coupling can be varied by switching the difference in potential between each pair of said control electrodes to 0 or another prescribed value.

Further, according to one of the specific features of the invention, there is provided an optical switch wherein a large number of switching elements for switching light beams to a plurality of optical waveguides are constructed on a substrate, comprising: a first group of optical waveguides consisting of N (N is an integer not smaller than 2) optical waveguides having a refractive index greater than that of the substrate; a second group of optical waveguides consisting of M (M is an integer not small than 2 but not greater than N) optical waveguides having a refractive index greater than that of the substrate; i (i is an integer not smaller than 1 but not greater than N−1) directional couplers of a first kind, each consisting of the ith and (i+1)th optical waveguides of said first group; (M−j) (j is an integer not smaller than 1 but not greater than M−1) directional couplers of a second kind, each consisting of the jth and (j+1)th optical waveguides of said second group, and M directional couplers of a third kind, each consisting of the Nth optical waveguide of said first group and the first optical waveguide of said second group.

Then, according to another specific feature of the invention, there is provided an optical switch wherein a number of switching elements for switching light beams to a plurality of optical waveguides are constructed on a substrate, comprising: a group of optical waveguides consisting of N (N is an integer not smaller than 2) optical waveguides; one optical directional coupler consisting of the ith ($1 \leq i \leq N-1$) and adjoining (i+1)th optical waveguides of this group, and another directional coupler consisting of the Nth optical waveguide of said group and another optical waveguide.

Any directional coupler type optical switch according to the invention, unlike conventional such switches, does not require both of the two states, of 0% coupling, where the crosstalk is minimized, and 100% coupling, but makes use of incomplete zero coupling with a new driving method, achieving the low level crosswalk without using stringent manufacturing methods.

BRIEF DESCRIPTION OF THE DRAWINGS

Further features and advantages of the invention will become apparent from the following detailed description, taken in conjunction with the accompanying drawings, wherein.

DESCRIPTION OF THE PREFERRED EMBODIMENTS

To facilitate understanding of the present invention, prior art optical switches will be described before describing the preferred embodiments of the invention.

Figure 1:
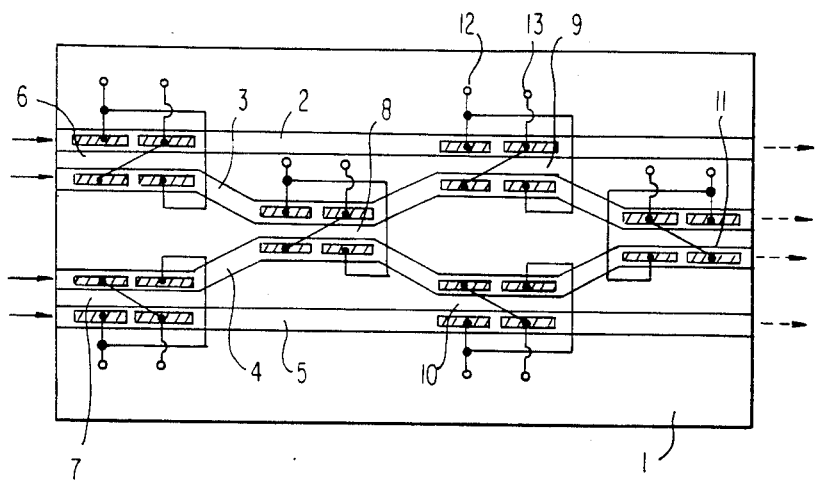
FIG. 1 is a plan view of a matrix type optical switch of the prior art.

Referring to FIG. 1, on a substrate 1 consisting of a dielectric such as lithium niobate or a semiconductor such as GaAs, there are formed optical waveguides 2, 3, 4 and 5 by diffusion or crystal growth. The optical guides 2 and 3 approach each other, and so do the optical guides 4 and 5, to constitute optical directional couplers 6 and 9, and 7 and 10, respectively.

Between the optical directional couplers 6–7 and 9–10 and beyond 9–10 in the direction of light transmission are formed optical directional couplers 8 and 11, respectively. These couplers 8, 11 are formed with optical waveguides 3 and 4. On each of the optical waveguides of said optical directional couplers 6, 7, 8, 9, 10 and 11 are arranged control electrodes. Thus, FIG. 1 illustrates a 4×4 matrix optical switch constructed by combining six optical directional couplers, each of which is a 2×2 optical switch element. Voltages are applied on the control electrodes of the directional coupler type optical switch elements to vary the refractive indices of the optical waveguides by the electro-optical effect of the substrate or by the rise or fall of the free carrier concentration, so that the coupling between the two optical waveguides can be regulated to either 0% or 100% coupling. In order to obtain the states of 0% and 100% coupling, each control electrode is usually bisected in the direction of light transmission, as shown in FIG. 1, and a voltage is applied on the two sections of the electrode to induce in the substrate electric fields opposite to each other in direction. For instance, a voltage is applied between electrode terminals 12 and 13 of the optical directional coupler 9.

Figure 2:
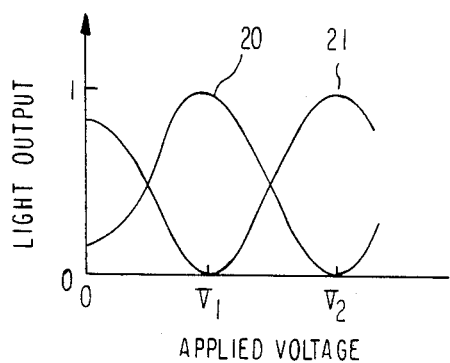
FIG. 2 is a chart illustrating the applied voltage-versus-optical output characteristic of a directional coupler for use in an optical switch.

FIG. 2 shows an example of the relationship between the applied voltage and the levels of output light beams from two output ports, with the incident light coming in through one input port. Thus, when the incident light comes into the optical directional coupler 9 from the optical waveguide 2, the level of the optical output coupled to the optical waveguide 3 is represented by the waveform 20 and that of the optical output remaining on the optical waveguide 2 is represented by the waveform 21. Therefore, the degree of coupling is 100% at the voltage $V_1$, and 0 at the voltage $V_2$. Thus, a conventional optical switch composed of switched directional couplers requires two voltages, $V_1$ and $V_2$, as referred to above. Since, moreover, the required voltages somewhat differ from element to element, there is needed a complex driving circuit. Furthermore, whereas the crosstalk in a directional coupler type optical switch is deteriorated by imperfections in optical waveguides or electrodes or by assymetry between two optical waveguides, to achieve the low crosstalk of not more than −20 dB usually required in the two states of 100% and 0% in coupling with a conventional structure, a high standard of manufacturing precision is needed, resulting in a poor yield. Although it is not impossible to design such an optical switch capable of achieving either 100% or 0% coupling at 0 volt using conventional structures and driving method, realizing a low crosstalk of not more than −20 dB at 0 volt requires an extremely high degree of precision in manufacture and therefore is considerably difficult in practice. Moreover, a matrix optical switch of any conventional structure has the major disadvantage that, when a large number of input and output ports are connected, within the matric switch to one another in a certain combination, if any two pairs out of them are to be interchanged, the connections of many optical switch elements will have to be altered at the same time. In other words, since the light path within the matrix optical switch has to be substantially changed when only two pairs of input and output ports are to be interchanged, there will be the momentary distrubance of connections between other input and output ports or an instantaneous drop in the output light levels of other output ports at the time of switching.

Figure 3:
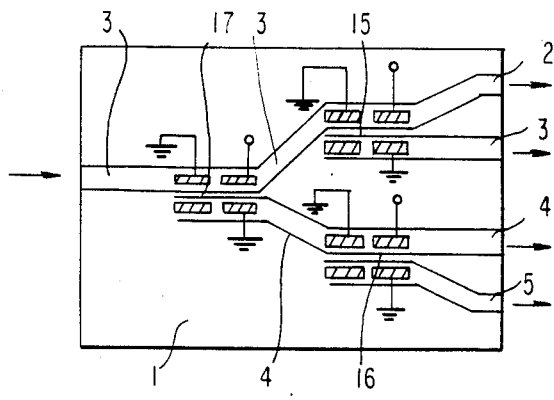
FIG. 3 is a plan view of a multi-channel optical switch of the prior art.

These problems would occur even with the use of a prior art light distributor as the optical switch. In such a device the optical input is alone entered into the input port of the optical waveguide 3 to be distributed among the four output ports. A simplified version of such an optical switch is illustrated in FIG. 3 in which a 1×4 optical switch composed of three directional couplers 15, 16 and 17 couple an input on optical waveguide 3 to form outputs one on each of the optical waveguides 2, 3, 4 and 5.

Figure 4:
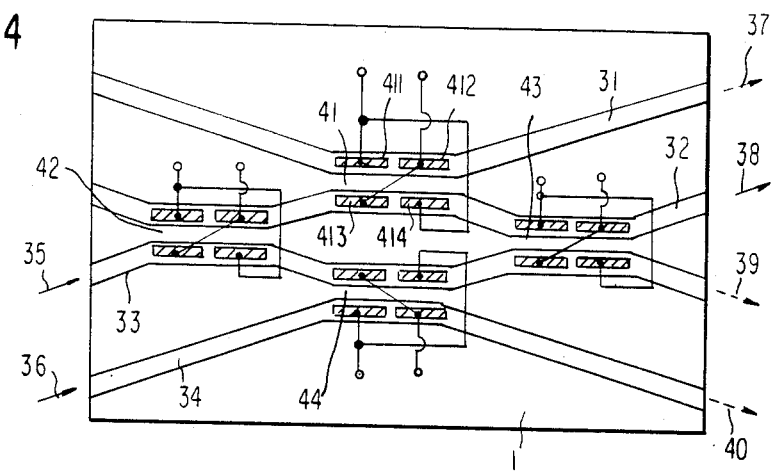
FIG. 4 is a plan view of a 2×2 matrix type optical switch constructed in accordance with a first preferred embodiment of the invention.

Next, the present invention will be described in detail with reference to one preferred embodiment of the invention illustrated in FIG. 4, which shows a plan view of a 2×2 matrix optical switch,. On a dielectric or semiconductor substrate 1 are formed optical waveguides 33 and 34, constituting a first group of optical waveguides and optical waveguides 31 and 32, constituting a second group of optical waveguides. The optical waveguides 31 and 32 make up an optical directional coupler 41; the optical waveguides 33 and 34, an optical directional coupler 44, and the optical waveguides 32 and 33, optical directional couplers 42 and 43 on the two sides of the optical directional couplers 41 and 44, as illustrated. On these optical directional couplers are arranged control electrodes, which are similar to those on the optical directional couplers in FIG. 1. As shown in FIG. 4, the control electrodes are here arranged so as to be split between adjoining optical waveguides, two on each waveguide. Diagonally facing control electrodes, i.e. 411 versus 414 and 412 versus 413, are connected to each other. The substrate used in this embodiment is a lithium niobate crystal plate, cut out in a direction normal to the Z axis and polished on the surface, and the optical waveguides 31, 32, 33 and 34 are constructed by thermally diffusing at 900° C. to 1100° C. strips of titanium, several hundreds of Å (for instance 500 Å) in thickness, formed by photolithography in an optical waveguide pattern. The width of each optical waveguide is several microns to several tens of microns (for example 10 microns); the interval between each pair of optical waveguides constituting an optical directional coupler, several microns, and the length of each optical directional coupler, several mm to a litter more than 10 mm. The control electrodes are thin metal films formed by photolithography, each measuring about the same as the optical waveguide in width, several mm to a little more than several mm in length and several thousands of Å in thickness. The four control electrodes contained in each directional coupler are so supplied with power that the electric fields of the optical waveguides constituting the coupler are opposite to each other. The structure of optical directional couplers for use in the present invention is well known to those skilled in the art, and is described in detail in, for instance, in U.S. Pat. No. 4,012,113.

The optical directional couplers 41, 42, 43 and 44 used in this embodiment, like those illustrated in FIG. 1, all have the applied voltage-coupling characteristic charted in FIG. 2. For instance, if each of them is about 8 mm in length, $V_1$ will be around 10 V and $V_2$, 20 to 30 V. In this embodiment, however, each optical directional coupler is used in a state where either one of the control electrodes is earthed and the other is applied with $V_1$ to achieve 100% coupling or this latter electrode, too, is applied with 0 volt. The optical directional couplers 41, 42, 43 and 44 are so designed as to achieve 0% to 20% coupling at 0 volt. When the voltage is 0 at the optical directional couplers 41 and 44 and is $V_1$ (i.e. 100% coupling) at the optical directional couplers 42 and 43, an output light beam 39 accounts for 80 to 100% of the energy of an incident light beam 35 entering the optical waveguide 33, and another outgoing light beam 37, 0 to 20%, coupled to the optical waveguide 31. Similarly, 80 to 100% of the energy of an incident light beam 36 entering the optical waveguide 34 goes out as an output light beam 40, and 0 to 20%, coupled to the optical waveguide 32, constitutes another outgoing light beam 38. In this embodiment, the outgoing light beams 37 and 38 are not used but eliminated. Meanwhile, when the voltage is 0 at the optical directional couplers 42 and 43 and is $V_1$ at the optical directional couplers 41 and 44, 80 to 100% of the incident light beams 35 and 36 turn into the output light beams 40 and 39, respectively.

In this embodiment, though it is difficult, as stated above, to make the coupling perfectly zero at 0 volt, the coupling can be readily reduced to 3 to 10%, and therefore it is not difficult to suppress the proportions of the outgoing light beams 37 and 38, which are the losses of the matrix light switch herunder, at no more than several per cent. Furthermore, between optical directional couplers of similar shapes, this embodiment, whose required voltage is $V_1$, can operate at a substantially lower voltage than the $V_2$ of the conventional couplers of FIG. 1.

Figure 5:
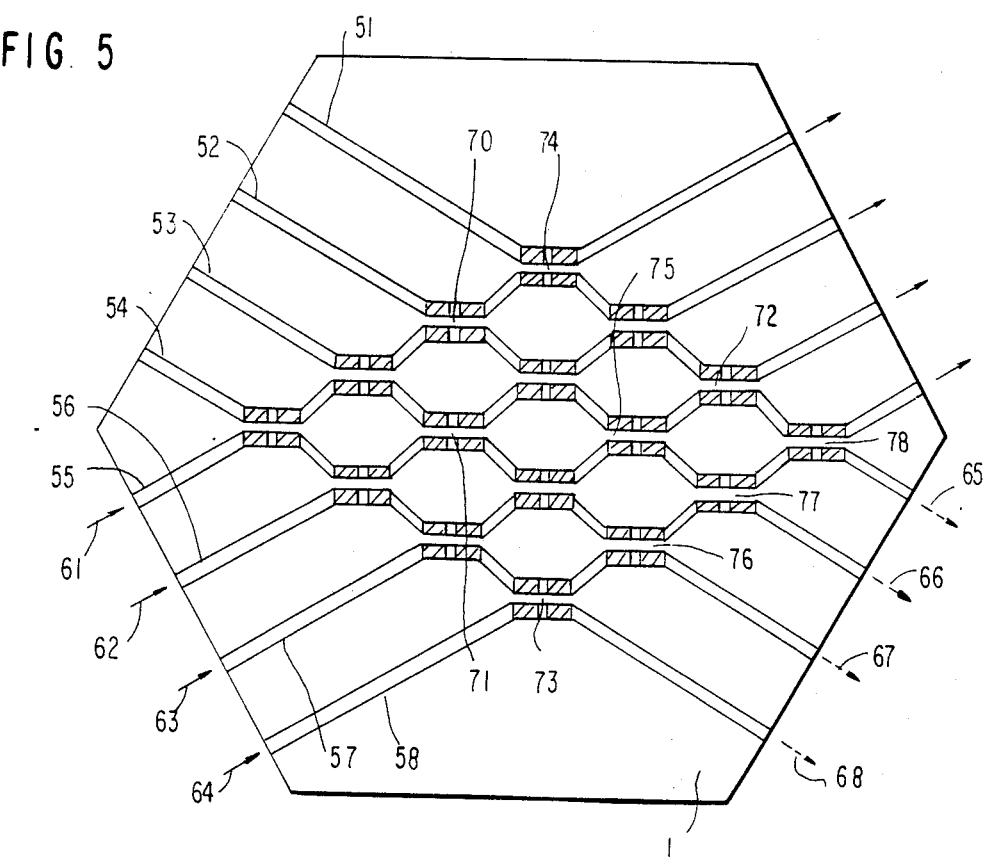
FIG. 5 is a plan view of a 4×4 matrix type optical switch constructed in accordance with a second preferred embodiment of the invention.

FIG. 5 shows a plan view of a 4×4 matrix optical switch embodying the teachings of the present invention. Reference numeral 1 designates a dielectric or semiconductor substrate similar to the corresponding component of the optical switch illustrated in FIG. 1. On the substrate 1 are arranged a first group of optical waveguides consisting of optical waveguides 55, 56, 57 and 58 and a second group of optical waveguides comprising optical waveguides 51, 52 53 and 54. The optical waveguides 51 and 52 constitute one, 52 and 53 two, 53 and 54 three, 54 and 55 four, 55 and 56 three, 56 and 57 two, and 57 and 58 one optical directional couplers. Altogether 16 optical directional couplers are thus formed. On each of these optical directional couplers are provided control electrodes similar to those in the first embodiment (the connections, though not illustrated herein for brevity's sake, are the same as in the first embodiment), and the applied voltage characteristic of each optical directional coupler is the same as in the first embodiment, the coupling being 0 to 20% at an applied voltage of 0 and 100% at $V_1$.

Input light beams 61, 62, 63 and 64 enter at one end of the optical waveguides 55, 56, 57 and 58, respectively, and output light beams 65, 66, 67 and 68 go out of the other end of the optical waveguides 55, 56, 57 and 58, respectively. If a voltage of 0 is applied on the control electrodes of every one of optical directional couplers 70 consisting of the optical waveguides 52 and 53, 71 consisting of the optical waveguides 54 and 55, 72 consisting of the optical waveguides 53 and 54, and 73 consisting of the optical waveguides 57 and 58, and one of $V_1$ is applied on those of all other optical directional couplers, 80 to 100% of the energy of the input light beams 61, 62, 63 and 64 will become the output light beams 66, 67, 65 and 68, respectively, and the remaining energy will go out of the optical waveguides 51, 52, 53 and 54 at their farther ends and be eliminated. Thus the inputs and outputs are connected in the combinations of the input light beam 61 to the output light beam 66, the input light beam 62 to the output light beam 67, the input light beam 63 to the output light beam 65, and the input light beam 64 to the output light beam 68. If two of these input-output combinations are to be altered to achieve, for instance, the input light beam 61-to-the output light beam 65 and the input light beam 63-to-the output light beam 66 combinations, the alteration can be effected by applying a voltage of $V_1$ on the optical directional couplers 70 and 72 and one of 0 on an optical directional coupler 74, comprising the optical waveguides 51 and 52, and an optical directional coupler 75, consisting of the optical waveguides 54 and 55. Since, in this process of alteration, the state of the optical directional couplers in the light paths connecting the input light beam 62 to the output light beam 67 and the input light beam 64 to the output light beam 68 remains unchanged, these output light beams 67 and 68 are unaffected by said switching.

While the matrix switch of the foregoing embodiment was described above with respect to the switching of multiple input light beams, it can as well be used as a distributor of one optical input into multiple outputs or as a selector of one out of multiple inputs for a single output. Here can be considered a case in which, for instance, only the waveguide 58 is used as the input waveguide, the light beam 64 coming in through it, and the output is to be taken out from the other end of the waveguides 55 to 57 as the light beams 65 to 68, respectively. If the voltage of the directional coupler 73 is 0 and that of directional couplers 76 to 78 is V, a predominant part of the optical input will go out as the output beam 68 and only a few per cent, from the farther end of the optical waveguide 54. To take out a predominant part as the light beam 67, a voltage of $V_1$ can be applied on the directional couplers 73, 77 and 78, and 0 volt on the directional coupler 76; to take one out as the light beam 66, $V_1$ on the directional couplers 73, 76 and 78 and 0 volt on the directional coupler 77, or to take one out as the light beam 65, $V_1$ on the directional couplers 73, 76 and 77 and 0 volt on the directional coupler 78.

Figure 6:
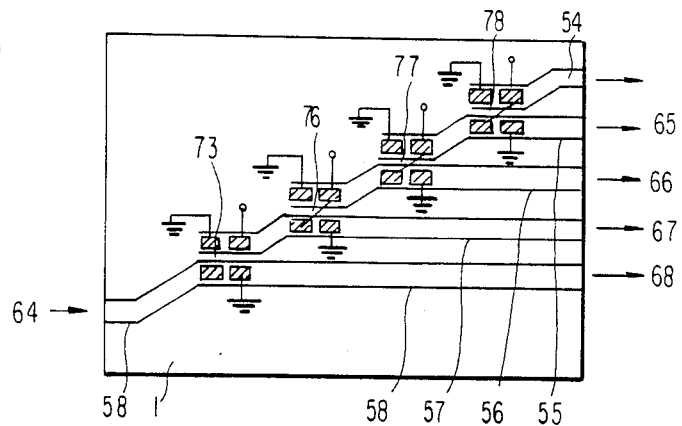
FIG. 6 is a plan view of a 1×4 optical switch constructed in accordance with a third preferred embodiment of the invention.

FIG. 6 illustrates a 1×4 switch, which is a simplified version of the foregoing 4×4 matrix switch shown in FIG. 5, the directional couplers other than 73, 76, 77 and 78 and dispensable parts of the waveguides being eliminated. Elements common with those of the embodiment of FIG. 5 are all given correspondingly the same reference numerals. Since the structure of this embodiment can be readily understood from the description of the preceding embodiment and its operation also is similar, its description is dispensed with herein for brevity's sake.

Figure 7:
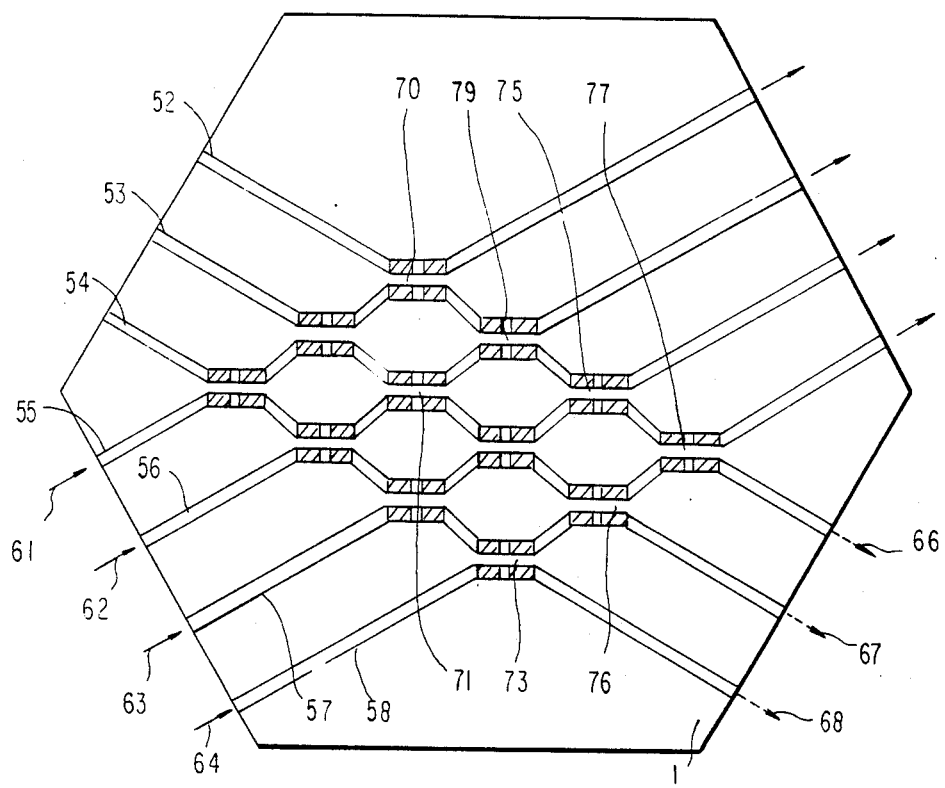
FIG. 7 is a plan view of a 4×3 optical switch constructed in accordance with a fourth preferred embodiment of the invention.

FIG. 7 illustrates a 4×3 matrix switch, whose first group of optical waveguides consists of four optical waveguides 55 to 58 and second group, of three optical waveguides 52 to 54. A first optical waveguide 58 of the first group adjoins a second optical waveguide 57 of the same group, and they together constitute a directional coupler 73. The second optical waveguide 57 and a third optical waveguide 56 constitute two directional couplers, and a third optical waveguide 56 and a fourth optical waveguide 55, form three directional couplers. These directional couplers are similar to the corresponding ones in the embodiment illustrated in FIG. 5. Meanwhile, first and second optical waveguides 54 and 53 of the second group constitute two directional couplers, and the latter and a third optical waveguide 52, one directional coupler. Further, the fourth optical waveguide 55 of the first group and the first optical waveguide 54 of the second group constitute three directional couplers. Their electrode structure is the same as in the first embodiment, and their operation, which can be readily understood from the description of the first embodiment, is not described here.

As hitherto described, the present invention can provide a matrix optical switch and its driving method, capable of switching between 0 volt and another voltage other and 0 volt, permitting ready achievement of low crosstalk, operable at a lower voltage than prior art devices, and capable of switching input and output ports without affecting the connection of any other port than those to be switched.

Needless to mention, the substrate materials, the shapes of optical waveguides and optical directional couplers, the shape of control electrodes and the like are not limited to those used in the foregoing preferred embodiments.

For instance, other usable substrate materials include the cyrstals of lithium tantalate, InP and other semiconductors of the III-V group of compounds, and electrodes split into more than two sections in the direction of light transmission can as well be used as control electrodes.

What is claimed is:

1. An optical switch having a number of switching elements for switching light beams to a plurality of optical waveguides constructed on a substrate, comprising:

a first group of optical waveguides consisting of N (N is an integer not smaller than 2) optical waveguides having a refractive index greater than that of the substrate;

a second group of optical waveguides consisting of M (M is an integer not smaller than 1) optical waveguides having a refractive index greater than that of the substrate;

directional couplers of a first kind, each consisting of one of the optical waveguides of said first group and an adjoining waveguide in the same group; and directional couplers of a second kind, each consisting of the Nth optical waveguide of said first group and a first optical waveguide of said second group, each of said directional couplers of said second kind containing a pair of parallel optical waveguide sections of said Nth optical waveguide of said first group and said first optical waveguide of said second group, respectively, said pair of optical waveguide sections being closely arranged on a common plane of the substrate and extending a predetermined length, and a pair of control electrodes arranged close to said pair of optical waveguide sections, and means for switching each of said directional couplers between an incomplete coupling in which less than 20 percent couples from one optical waveguide to another optical waveguide and a complete coupling in which almost 100 percent couples from one optical waveguide to another optical waveguide, in response to a potential difference of either zero volts or another prescribed value between each pair of said control electrodes, for incomplete coupling and complete coupling, respectively.

2. An optical switch, as claimed in claim 1, wherein each pair of said optical waveguides are coupled by one directional coupler.

3. An optical switch, as claimed in claim 1, involving directional couplers of a third kind, each comprising one optical waveguide of the second group and the adjoining optical waveguide of the same group, each of the directional couplers of the third kind having the same structure as that of said first and second directional couplers and operable in the same manner as that of said first and second directional couplers.

4. An optical switch, as claimed in claim 3, wherein there are i (i is an integer not smaller than 1 but not greater than N−1) directional couplers of said first kind, each consisting of the ith and (i+1)th optical waveguides of said first group.

5. An optical switch, as claimed in claim 4, including M directional couplers of said second kind.

6. An optical switch, as claimed in claim 5, including (M−j) (j is an integer not smaller than 1 but not greater than M−1) directional couplers of said third kind, each consisting of the jth and (j+1)th optical waveguides of said second group.

7. An optical switch having a number of switching elements for switching light beams to a plurality of optical waveguides constructed on a substrate, comprising:

a first group of optical waveguides consisting of N (N is an integer not smaller than 2) optical waveguides having a refractive index greater than that of the substrate;

a second group of optical waveguides consisting of M (M is an integer not smaller than 2) optical waveguides having a refractive index greater than that of the substrate;

i (i is an integer not smaller than 1 but not greater than N−1) directional couplers of a first kind, each consisting of the ith and (i+1)th optical waveguides of said first group;

(M−j) (j is an integer not smaller than 1 but not greater than M−1) directional couplers of a second kind, each consisting of the jth and (j+1)th optical waveguides of said second group; and M directional couplers of a third kind, each consisting of the Nth optical waveguide of said first group and the first optical waveguide of said second group;

each of said directional couplers containing a pair of control electrodes arranged close to a pair of corresponding optical waveguides, and means for switching each of said directional couplers between an incomplete coupling in which less than 20 percent couples from one optical waveguide to another optical waveguide and a complete coupling in which almost 100 percent couples from one optical waveguide to another optical waveguide, in response to a potential difference of either zero volts or another prescribed value between each pair of said control electrodes, for incomplete coupling and complete coupling, respectively.

8. An optical switch having a number of switching elements for switching light beams to a plurality of optical waveguides constructed on a substrate, comprising:

a group of optical waveguides consisting of N (N is an integer not smaller than 2) optical waveguides;

one another optical waveguide directional coupler consisting of the ith ($1 \leq i \leq N-1$) optical waveguide and the adjoining (i+1)th optical waveguide of said group; and another directional coupler consisting of the Nth optical waveguide of said group and the another optical waveguide;

each of said directional couplers containing a pair of control electrodes arranged close to a pair of corresponding waveguides, and means for switching each of said directional couplers between an incomplete coupling in which less than 20 percent couples from one optical waveguide to another optical waveguide and a complete coupling in which almost 100 percent couples from one optical waveguide to another optical waveguide, in response to a potential difference of either zero volts or another prescribed value between each pair of said control electrodes, for incomplete coupling and complete coupling, respectively.

* * * * *

UNITED STATES PATENT AND TRADEMARK OFFICE
CERTIFICATE OF CORRECTION

PATENT NO. : 4,618,210
DATED : October 21, 1986
INVENTOR(S) : Michikazu KONDO

It is certified that error appears in the above-identified patent and that said Letters Patent is hereby corrected as shown below:

Column 1, Line 35, delete "There", and insert therefor --These--.

Column 1, Line 64, delete "Networks", and insert therefor --Networks,--.

Column 3, Line 54, delete "crosswalk", and insert therefor --crosstalk--.

Column 5, Line 3, delete "in".

Column 5, Line 15, after "switch", insert --,--.

Column 5, Line 22, delete "distrubance", and insert therefor --disturbance--.

Column 5, Line 39, after "switch" and before ".", delete ",".

Column 5, Line 68, delete "litter", and insert therefor --little--.

Column 6, Line 65, after "Altogether", insert --,--.

Column 7, Line 53, delete "V", and insert therefor --$V_1$--.

Column 8, Line 32, delete "and", and insert therefor --than--.

Signed and Sealed this

Fourteenth Day of April, 1987

*Attest:*

DONALD J. QUIGG

*Attesting Officer*  *Commissioner of Patents and Trademarks*